(12) United States Patent
Dunbar et al.

(10) Patent No.: US 7,792,806 B2
(45) Date of Patent: Sep. 7, 2010

(54) RATE CHANGE

(75) Inventors: Geoffrey T. Dunbar, Kirkland, WA (US); Kirt Debique, Seattle, WA (US); Glenn F. Evans, Kirkland, WA (US); Robin C. B. Speed, Winchester (GB); Stephen Rowe, Bellevue, WA (US); Rebecca C. Weiss, Menlo Park, CA (US); Matthijs Gates, Wellesley, MA (US)

(73) Assignee: Microsoft Corporation, Redmond, WA (US)

( * ) Notice: Subject to any disclaimer, the term of this patent is extended or adjusted under 35 U.S.C. 154(b) by 1738 days.

(21) Appl. No.: 10/609,182

(22) Filed: Jun. 27, 2003

(65) Prior Publication Data

US 2004/0268397 A1   Dec. 30, 2004

(51) Int. Cl.
*G06F 7/00* (2006.01)
*H04N 5/91* (2006.01)

(52) U.S. Cl. ............... 707/705; 386/68; 386/70; 386/95; 707/914

(58) Field of Classification Search ............ 386/68, 386/69, 70, 95; 707/705, 999.102, 999.003, 707/999.107, 914
See application file for complete search history.

(56) References Cited

U.S. PATENT DOCUMENTS

2002/0165912 A1* 11/2002 Wenocur et al. ........... 709/203
2004/0001694 A1   1/2004 Evans et al.
2005/0076039 A1*  4/2005 Ludwig et al. ............ 707/100

OTHER PUBLICATIONS

Nathan Faiman, David Giese, A Rokanuzzaman, Mark Schroeder, *A Survey of the Java Media Framework 2.0*, Feb. 23, 2000, 54 pages total.

* cited by examiner

*Primary Examiner*—Vincent Boccio
(74) *Attorney, Agent, or Firm*—Workman Nydegger

(57) ABSTRACT

A system and methods provide handling of variable rate playback in a multimedia computer architecture. The systems and methods provide data structures and interfaces that enable a computer architecture and components therein with the ability to playback data at speeds faster and slower than real-time, to playback data in reverse, and to change the rate of playback at any point during playback. One embodiment is a method for providing low-latency, glitch-free changes in a multimedia architecture. Other embodiments are directed to defining multimedia component responsibilities for making rate changes, allowing rate changes to work with standard playback types, coder-decoders, and renderers. The methods include determining a minimum of the maximum reported playback rates and determining minimum and maximum playback rates in a set of modes including: reverse skip mode, reverse key frame mode, reverse full mode, forward full mode, forward key frame mode, and forward skip mode.

14 Claims, 9 Drawing Sheets

GOP

RATE CHANGE

TECHNICAL FIELD

This invention relates generally to computing and, more particularly, relates to handling multimedia data in a computing environment. In particular, the invention relates to methods and systems for processing playback speed, direction and rate changes.

BACKGROUND OF THE INVENTION

As the abilities of computers expand into entertainment genres that once required separate electronic components, increased efficiency and user-friendliness is desirable. One solution is Microsoft's® DirectShow®, which provides playback of multimedia streams from local files or Internet servers, capture of multimedia streams from devices, and format conversion of multimedia streams. DirectShow enables playback of video and audio content of file types such as MPEG, Apple® QuickTime®, Audio-Video Interleaved (AVI), and WAV.

DirectShow is an open and componentized system. With such a system problems with buffering and stream alignment limit the degree of interactivity between an application and user-perceived changes in the actual playback speed. The actual playback speed determines the amount of time that each frame of data is displayed. Fast playback rates typically display frames for shorter periods of time than slower playback rates, unless a fast playrate displays only keyframes or I-frames, in which case the rate of a frame's position in the content may be such that they are displayed for a longer period of time. Full content fast playback rates have high bandwidth requirements that can exceed most processor storage retrieval and hardware capabilities. Usually fast playback rates are approximated using so-called "scan modes" that selectively present only a (small) portion of a data stream by discarding some of the data of the stream. This is somewhat analogous to a rapidly progressing slide show.

Many video applications, such as those that execute on computers or in connection with interactive television sets, are composed of a user interface that controls a source (or source filter). The source (or source filter) is part of a data processing pipeline that processes the data so that the data can be ultimately rendered for a user. The source reads media files and typically passes the data samples or buffers (which are usually compressed using, e.g., MPEG) to some type of decoder for processing. The decoder decompresses the data and passes it to some type of renderer for rendering the data. The renderer typically uses an internal (or external) clock, and various timing information that is included with the data samples themselves, to present or render the samples at the correct time. When the renderer begins processing, an initial rendering clock time can be passed to the source and decoder. The source can then begin to produce samples with timestamps that start at some point after the initial renderer time. The timestamps are used by the renderer to schedule and render the various data samples based on their authored time of presentation. Small delays between pipeline and/or processing components, can occur since samples are buffered between each stage in the data processing pipeline. Pipeline latency is the cumulative propagation delay of the sample from the source to the time that it is presented or rendered. A continuing goal of developers to enable systems to smoothly playback data, such as video content, at different playback rates, for both forward and reverse directions. The nature of data processing pipelines and various data formats, however, continues to present challenges to developers.

SUMMARY OF THE INVENTION

Embodiments of the present invention provide systems and methods for handling variable rate playback in a multimedia computer architecture. The systems and methods provide data structures and interfaces that enable a computer architecture and components therein with the ability to playback data at speeds faster and slower than real-time, to playback data in reverse, and to change the rate of playback at any point during playback.

One embodiment is directed to a method for providing low-latency, glitch-free changes in a multimedia architecture. Other embodiments are directed to data structures and interfaces for defining multimedia component responsibilities for making rate changes, allowing rate changes to work with any standard playback types, coder-decoders, and renderers.

More specifically, one embodiment is a method for determining the capabilities of a media system, and includes querying each of one or more functional objects in the media system to determine a functional limit of each of the objects for a predetermined function, and determining which of the functional limits of the one or more objects maximally limits the capability of the media system for the predetermined function. The predetermined function can be a maximum playback rate of a multimedia stream. The method can also include determining a minimum of the maximum reported playback rates and determining minimum and maximum playback rates in a set of modes including: reverse skip mode, reverse key frame mode, reverse full mode, forward full mode, forward key frame mode, and forward skip mode.

Another embodiment is directed to determining whether a playback rate is supported in a multimedia system. In the embodiment, the multimedia system receives a query for rate support and then retrieves media source components and stream sink components required for a rate change to the playback rate. For each retrieved media source component, the system determines if rate control services are supported. Then the system returns an indication to a user as the feasibility of supporting the rate change, and retrieves transforms required for the rate change. For each transform, the system calls a rate control service, and for any transform that is a decoder, the system assumes any rate can be supported. If rate control is not supported, the system assumes any positive rate can be supported. Next, the system can notify a calling application in response to the query for rate support, the notification assuming that a media engine will decode any samples and reverse the samples to perform backward rate changes if a decoder required for the playback rate is not configured to perform backward rate changes.

Another embodiment is directed to a method for scheduling a rate change in a multimedia system. The method includes receiving a query to set a playback rate, receiving one of an identified time for the playback rate or a request for immediate playback rate change, calling one or more multimedia components required to perform the playback rate; and scheduling the playback rate using a presentation clock, the presentation clock determining a time to implement the playback rate according to race conditions among the multimedia components. In an embodiment, the multimedia components atomically schedule the playback rate and return a scheduled time to the presentation clock. In one embodiment, the presentation clock synchronously calls a routine to set a function on a time source wherein calling the routine changes the rate at which the presentation clock is running. In another embodiment, the presentation clock calls a routine to query one or more clock state sinks that are media sinks configured to operate as renderers.

Another embodiment is a multimedia system that includes a control layer configured to receive one or more media data streams from an application; and a core layer coupled to the control layer, the control layer including a media engine component configured to query each of one or more core layer components in the multimedia system to determine a functional rate limit of each core layer component for a predetermined function, the media engine configured to determine which of the functional limits of the core layer components maximally limits the multimedia system. The core layer includes media sources coupled to the control layer, the media sources configured as inputs to the multimedia system, stream sources coupled to the control layer, the stream sources providing the media data streams, transforms coupled to the control layer, the transforms configured to operate on the media data streams, media sinks coupled to the control layer, the media sinks configured to operate as outputs for the media data streams, and stream sinks coupled to the control layer, the stream sinks configured to store or render the media data streams.

The control layer includes the media engine, a topology loader configured to identify data flow, a media session configured to interface with core layer components, and a media processor configured to perform transforms on the media data streams.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
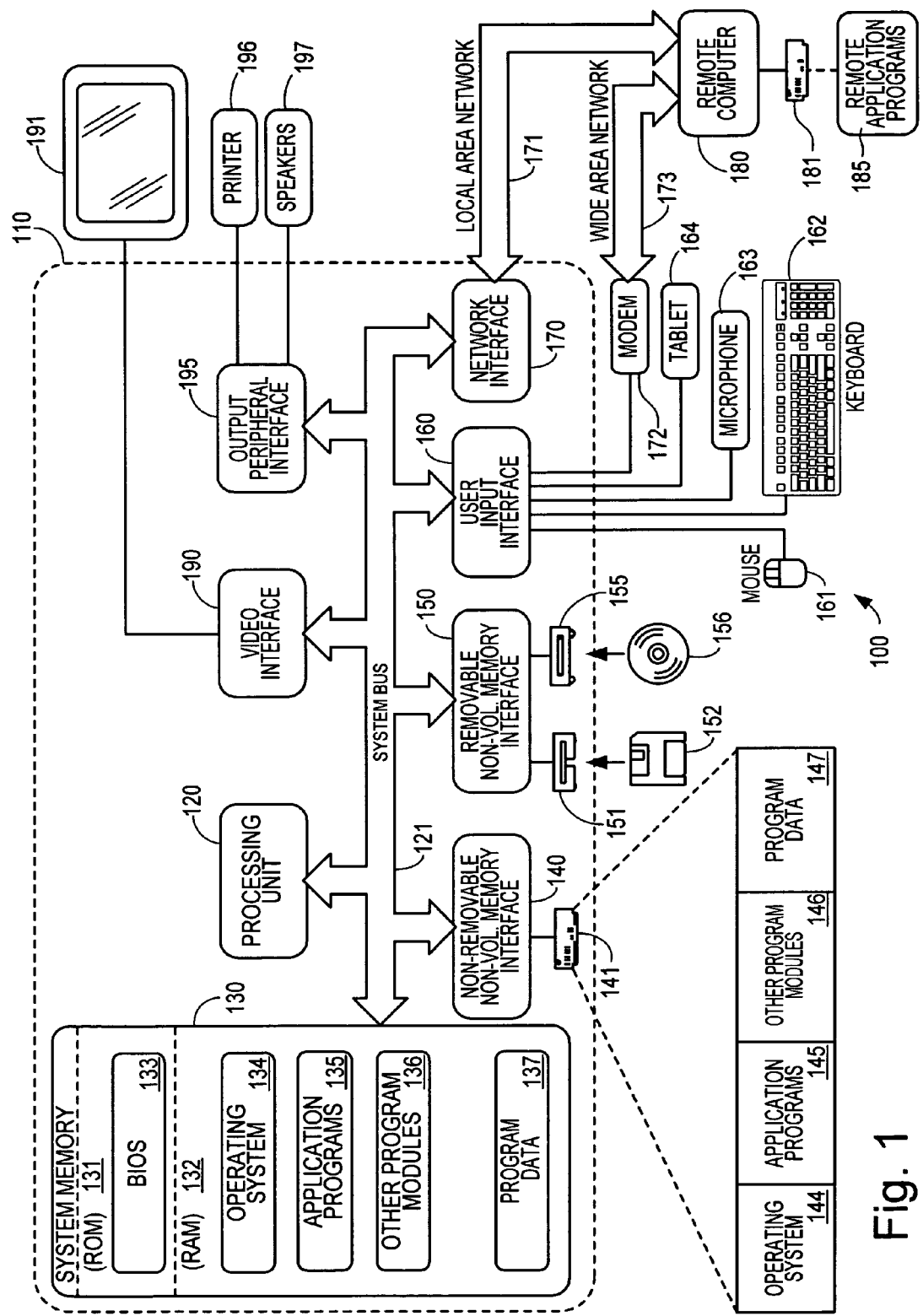
FIG. 1 is a block diagram generally illustrating an exemplary computing device with which the present invention can be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
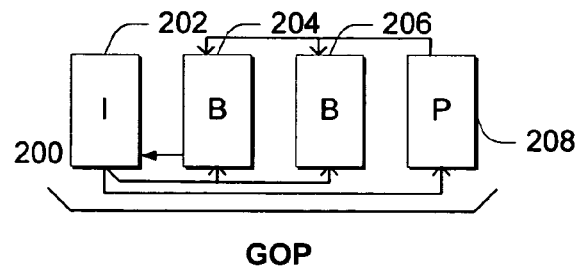
FIG. 2 is a block diagram of a group of picture (GOP) in accordance with an embodiment of the present invention.

Referring now to FIG. 2, embodiments are directed to a system and method for controlling rate changes in multimedia data streams that can include but are not limited to Motion Picture Expert Group 2 (MPEG-2), Windows Media Video, digital video disc (DVD) and high definition television (HDTV) formats. Prior art systems and methods were disclosed for DirectShow® in original U.S. patent application Ser. No. 10/185,800, filed on May 24, 2002. FIG. 2 illustrates a forward decoding format, such as an MPEG-2 format. HDTV format uses MPEG-2 format. An example representation of an MPEG-2 format is shown in FIG. 2. Each video sequence is composed of a series of Groups of Pictures (or "GOPs"). A GOP is composed of a sequence of pictures or frames. Frames can be encoded in three types: intra-frames (I-frames), forward predicted frames (P-frames), and bi-directional predicted frames (B-frames).

An I-frame or "key frame" (such as I-frame 202) is encoded as a single image, with no reference to any past or future frames. The encoding scheme used is similar to Joint Photographic Expert Group (JPEG) compression. A P-frame (such as P-frame 208) is encoded relative to the past reference frame. P-frames can also be considered as "delta frames" in that they contain changes over their reference frame. A reference frame is a P- or I-frame. The past reference frame is the closest preceding reference frame. A B-frame (or bi-directional frame, such as frames 204 and 206) is encoded relative to the past reference frame, the future reference frame, or both frames. The future reference frame is the closest following reference frame (I or P). B-frames are a function of only the adjacent reference frames.

The GOP structure is intended to assist random access into a sequence. A GOP is typically an independently decodable unit that can be of any size as long as it begins with an I-frame.

One problem associated with a forward decodable format, such as the MPEG-2 format pertains to being able to playback the data in reverse. Playing the data forward is typically not a problem because the format itself is forward decoding—meaning that one must typically decode the I frame first and then move on to the other frames in the GOP. Playing back the data in reverse, however, is a little more challenging because one cannot backward-decode the GOP.

In some instances, when a sequence of video frames are encoded into a forward decoding format such as MPEG-2 on a DVD disk, the video is actually broken into small autonomous units that are self-contained with no spill over dependencies into neighboring units. The units are typically ½-second units or video object basic units ("VOBUs"). The advantage of this format is that when you play the video, you can progress through the video units one by one. To jump to an arbitrary piece of video, a user can jump to the video unit of interest and the audio and video will be synchronized. The location at which all streams are synchronizable is referred to as a "clean point". Accordingly, when the video and audio units are compressed, they are compressed in a unit that is to be rendered at the exact same time. That is, there is no skew between the audio and video.

All references to I-frames when discussed within the MPEG-2 context can be extended to keyframes in other data formats. For purposes of the present disclosure, embodiments herein apply to arbitrary forward-decodable formats with I-frames or keyframes. The use of the MPEG-2 context is exemplary only.

In other instances, there is no correlation between streams, and clean points are not available across streams. Examples of this include Windows Media Video files, and High Definition Television-ATSC (American Television Standards Commission) uses the MPEG-2 format as well. Here, however, video blocks and audio blocks are aligned with a bit of a skew. In this case, a multimedia application cannot simply fast forward or jump to a certain point in the stream because audio and video do not begin at the same location in a stream. Video can start at a given point and the associated audio sample begins at another location in the stream. Additionally, the audio sample can only be decoded forward as a block. Thus, a multimedia application needs to back up within the stream and look for the associated audio sample. The audio will usually be delivered later than the video. This is because video has a longer decompression time, and the codec must buffer reference frames (I or P) in order to decode B frames. So the user actually needs to back up in the stream to look for the associated video stream vs. the audio stream. Depending on the particular format, the multimedia application will not know where the beginning of the corresponding audio block or sample is located. Thus, a user must look back in one or more streams for some point before a point of interest. One of skill in the art will appreciate with the benefit of this disclosure that there can be other types of content than audio and video content that can be of use to a user. For example, private streams that carry closed captioning or Internet protocol type traffic and the like that is associated and considered part of a program can contain the audio and video traffic. Therefore, there may be searching required to find the corresponding content for a particular timestamp and a multimedia application may need to find data for all streams prior to a predetermined seek location or timestamp.

With these different types of formats come challenges when one attempts to enable different playback rates and directions for an open and componentized solution.

Figure 3:
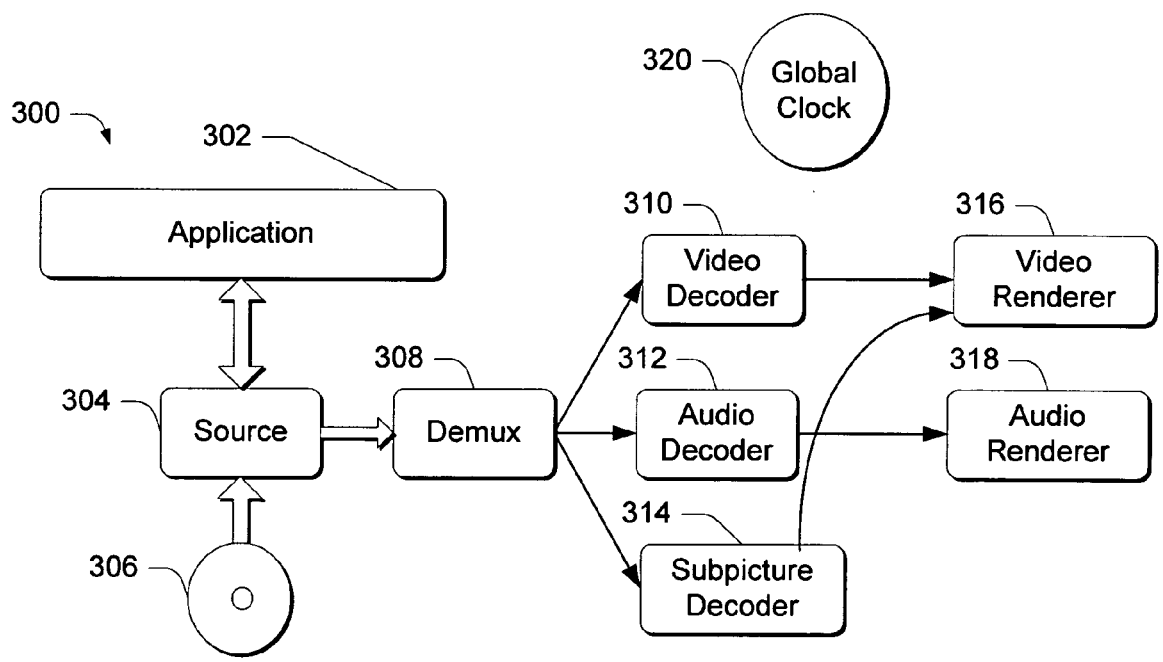
FIG. 3, labeled "prior art," is a block diagram of a prior art system that performs rate changes.

Referring to FIG. 3, labeled "prior art" a system 300 illustrates an example of how a prior art multimedia system may render data from a DVD and is exemplary only to illustrate advantages of embodiments directed to processes described herein. System 300 includes an application 302 that communicates with a source component 304 that reads data off of DVD 306. The data that is read off of the DVD includes audio and video data that has been encoded and multiplexed together. As the source reads the data off of DVD 306, the source applies timestamps to the data packets which are then used to synchronize and schedule the packets for rendering. The packets are then provided to a demultiplexer 308 which splits the packets into different constituent portions including audio, video and, if present, subpicture packets. The packets are then provided by demultiplexer 308 to an associated decoder such as video decoder 310 for decoding video packets, audio decoder 312 for decoding audio packets and subpicture decoder 314 for decoding subpicture packets. Each one of the packets has associated timing information, which defines when the packet is supposed to be rendered. The various decoders then decompress their associated packets and send the individual data samples or packets, including the packets' timestamps to the appropriate renderers, such as video renderer 316 and audio renderer 318.

System 300 also typically includes a global clock 320 that is used by the various renderers to ascertain when to render certain data samples whose timestamps coincide with a time indicated by the global clock.

Assume now that a user indicates, via application 302, that he/she wish to have the data samples rendered at a different, perhaps faster rate.

A past approach for regulating a forward rate change is to manipulate the global clock 320. That is, if one wishes to play data twice as fast as the normal rate, then by manipulating the speed of the global clock, the desired rate change can be implemented. The problem with this approach is that the audio renderer can experience problems associated with frequency shifts and distorted audio output, which degrades the user's experience. Additionally, when the video renderer attempts to comply with the clock change, the video renderer can get behind in its processing which results in the renderer dropping samples to attempt to catch up. The overall result of this is a frequency shift on the audio, and a tug-and-pull on the video. The subpicture component, which can produce data that gets sent to the video renderer, can also have problems associated with the global clock change thus causing, for example, the subpicture to be rendered at an inappropriate time or in connection with inappropriate video. Thus, the quality of the output can be significantly degraded.

Another approach that attempts to deal with a forward rate change is to have source 304 notify demultiplexer 308, which, in turn, notifies video decoder 310 to make the appropriate rate change. The decoder 310 can then do scaling operations on the samples' timestamps to make the video play at a different rate. The problem with this approach is that there is no guarantee that the video decoder 310, audio decoder 312 and subpicture decoder 314 will process the samples using the same techniques and algorithms-which is particularly true if the different decoders come from different vendors. Hence, the rate change can be affected at slightly different speeds which, in turn, can cause the video and audio to start to drift. Even worse, the subpicture can become unsynchronized which can cause it to appear at the wrong time.

Figure 4:
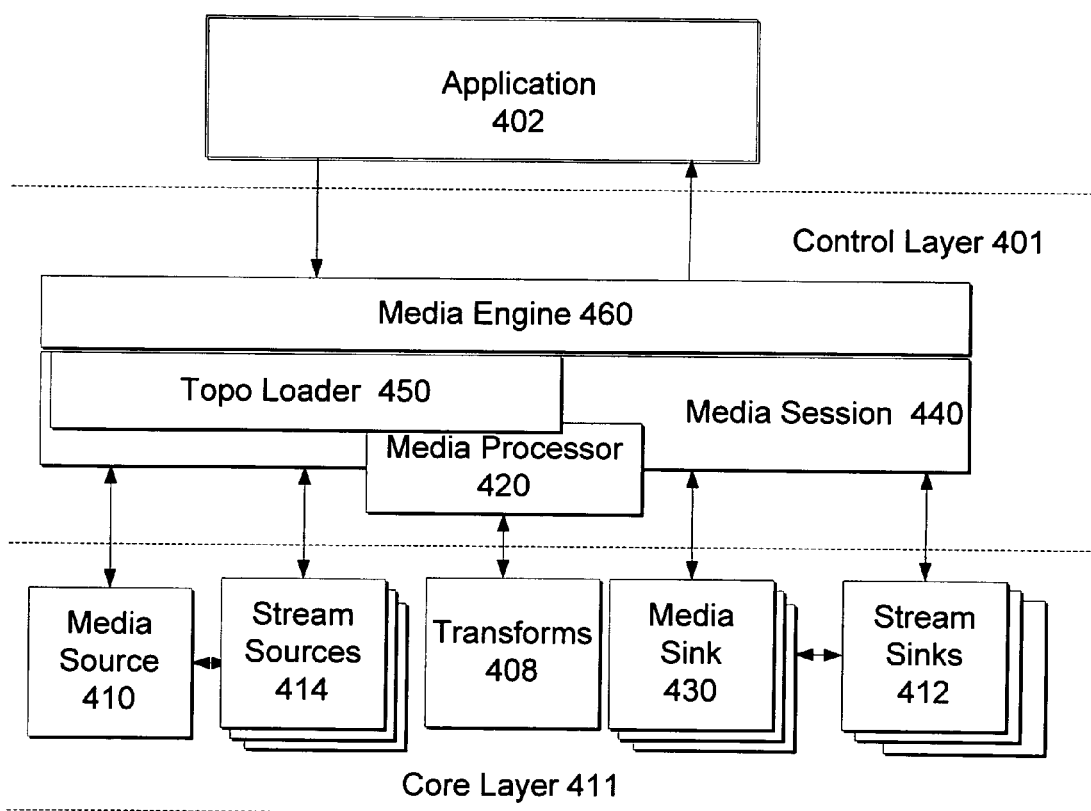
FIG. 4 is a block diagram illustrating a more detailed illustration of components of the media foundation system in accordance with an embodiment of the present invention.

Referring now to FIG. 4, a block diagram illustrates a media foundation system interacting with an application 402. A media foundation system includes a control layer 401 and a core layer 411. Core layer 401 is shown including a media source 410, stream sources 414, transforms 408, media sink 430 and stream sinks 412, which together are included in a playback pipeline. Control layer 401 is shown with media engine 460 interacting with application 402, topology loader 450, media session 440 and media processor 420. Application 402 receives and sends media streams to media foundation system 400. Data generally flows through the media foundation beginning with a media source 410, flowing through the media processor 420 via media session 440. Media processor 420 performs transforms on the data streams, and outputs data via media sink 430.

Media processor 420 receives a topology indicating the types of transforms to be performed on a data stream, and media session 440 guides when events in a topology occur. Topology loader 450 ensures that events prescribed in a topology occur. Thus, the media foundation system provides interfaces and a layout for connecting streaming media objects.

Media source 410 and stream sources 414 provide either captured or retrieval of multimedia data and provide this data to media engine 360. The sources of data include but are not limited to a disk such as a hard drive, CD, or DVD, the internet, random access memory (RAM), video RAM, video cameras, scanners, still image cameras, and microphones. Media sink 430 includes objects which control the transfer of data in stream sinks 412. Stream sinks 412 includes objects which accept data from control layer 401 for storage or rendering. Sinks of data include but are not limited to a disk such as a hard drive, writable CD, or writable DVD, the internet, random access memory (RAM), video RAM, video cameras, printers, display devices such as monitors, and speakers. The data for both media source 410 and media sink 430 can be transported over many types of media including but not limited to Ethernet, wireless networks, analog cables before digitization, USB, IEEE 1384, parallel port, serial port, and disk interfaces.

Transforms 408 include objects which manipulate the data. These transforms include of encoders, decoders, splitters, multiplexers, audio processing such as bass and treble control for adding effects such as reverb, video processing such as adjusting color masks, image sharpening, and contrast or brightness control. The encoders and decoders handle both audio, video, and image data. Video data types can include but are not limited to MPEG, Windows Media Video, Apple Quicktime, AVI, DVD, HDTV, and H.263. Note that many of the video standards are true multimedia standards in that these standards have provisions to transfer both audio and video. Image data formats include JPEG, GIF, Fax, and Tiff. Audio standards can include MP3, Windows Media Audio, PCM, ADPCM, as well as standards for CD playback. Transforms 408 can be used to convert data from one format to another. For example, a user can convert a JPEG image into a format, such as RGB, suitable for display on a monitor.

The playback pipeline has six distinct modes of operation while playing media at different rates and directions. For forward playback, typically the decoder operates in either 'full frame mode' where it decodes all of the input data or in keyframe mode where it only decodes keyframes.

Various components may have resource limitations that prevent presentation of the full multimedia stream, for example, a decoder may have limited resources (such as the CPU or auxiliary decoding hardware) which causes different maximum rates at which multimedia data can be produced. Thus, there could be a maximum decoding rate for full frame decoding and a maximum decoding rate for keyframe decoding, Since the decoding cost of a continuous stream of keyframes is higher (e.g. 5 cycles per frame) than a stream of, full frame data (an average of 2 cycles per frame) its per-frame decoding rate is lower. The overall keyframe decoding rate is higher since the keyframes are temporally sparse. A media source might have limited resources (disk I/O bandwidth, network bandwidth) which similarly limit the maximum rates.

This distinction creates three forwards modes of operation. One mode includes running the multimedia pipeline at a rate less than or equal to the decoder's maximum full frame forward mode. The source reads full frame data from the media and passes it to the decoder which decodes the data and produces full frame data to pass to the sink. The sink alters its display rate to achieve the desired rate. A decoder can also perform some type of data reduction for higher rates such as not producing every other frame on the output. The main distinction with this mode is that the decoder is not a limiting factor and the sink manages the rate change. For typical video stream decoding, a decoder can decode in this 'fullframe' decoding mode up to 4× speed (known as the "MaxFullFrameRate").

Beyond the full frame decoding rate, the source can be configured to limit the data being passed to the decoder to keyframes only. The source can produce keyframes as tightly spaced together as possible. The decoder decodes the keyframes and passes them to the sink to be displayed.

Eventually, the decoder will be saturated when decoding keyframes (beyond the MaxKeyframeRate). At this point, the input to the decoder is maintained at (or below) the MaxKeyframeRate and it is the source's responsibility to produce progressively more temporally sparse keyframes. It effectively skips through the content between keyframes ensuring that the spacing does not exceed the maximum KeyframeRate. This mode is also known as 'skip frame' mode.

A similar situation exists for reverse playback up to the rate MaxReverseFullFrameRate (for fullframe reverse decoding), MaxReverseKeyframeRate (for keyframe decoding mode) and beyond the MaxReverseKeyframeRate (for reverse skip frame mode). An important observation is that in each mode, a different 'format' of data is flowing in the pipeline. Thus, in forward fullframe mode, full forward frame data is passed to the decoder. The decoder passes uncompressed full frame (or possibly reduced) data to the sink. In forward keyframe mode, the source passes keyframes to the decoder which passes each to the sink. In forward skip mode, the source passes sparse keyframes to the decoder.

Media engine 460 interacts with other components of the media foundation system to provide rate changes and rates. To specify a rate, the system uses floating point values (type float), linearly indicating the speed of playback. A rate of 1.0 indicates normal speed playback, a rate of 2.0 indicates playback of samples at twice normal speed, and a rate of 0.5 indicates playback of samples at one half normal speed. Negative rates specify that the playback is to proceed backwards.

Media source 410 provides presentation timestamp for media samples on a media stream. The samples preserve the presentation timestamps regardless of the rate. In an embodiment, no timestamp scaling is done as samples move through a multimedia architecture, such as media foundation.

Media foundation also includes a presentation clock that runs time according to a current rate. If the rate is 2.0, the time reported by the presentation clock runs at double real-time. If the rate is −0.5, the time reported by the presentation clock runs at half-time, and decreases. Since all sinks display data according to one clock, there is no longer an issue of time 'drifts' due to different components calculating effective timestamps after accounting for rate changes.

In an embodiment, media engine 460 responds to requests for rate direction changes. To change the direction of playback, the media engine must play out all remaining content up to the timestamp of the direction change, then stop and discard the data in the pipeline, sets the rate, and then starts engine 460 again. All data that is repeated after starting playback in the new direction is discarded. For example, if the data is passed in blocks of 5 frames (1 . . . 5 and 6 . . . 10) and a direction change needs to occur at frame 3, then media engine would play out 1, 2 then 3 and discard 4 and 5. When it plays backwards it would be passed 1 . . . 5 again so it has to discard frames 3, 4 and 5 and only present 2 then 1. If media engine 460 receives a request to change the rate while in the process of changing the rate or mode, media engine 460 first completes the original rate change, and then processes the second rate change. Thus, media foundation does not track multiple rates unless they are within in the same mode in which case the components need to keep a list of pending rate changes to be applied as they decode data. Thus, the media engine may have multiple rate changes queued for processing, but only one rate will be active on each media component at a given time, and the individual media components do not need to track multiple rate changes.

In an embodiment, media engine 460 supports backwards decoding for coder-decoders (codecs) that do not support backwards decoding, decodes data forwards, and then reversing the samples to support backwards playback. In an embodiment, media engine performs a sample reversing code once that can be reused by any codec needing to implement the same functionality.

For playback below the MaxFullframe rates, the renderers must be configured to render the data properly for the rate to be supported. In particular, the audio renderer must be configured to create a stream that matches the audio card's actual playback ability.

In another embodiment, the audio renderer may chose to perform pitch correction of the content at the new non-1.0× rate to maintain the correct pitch.

Figure 5:
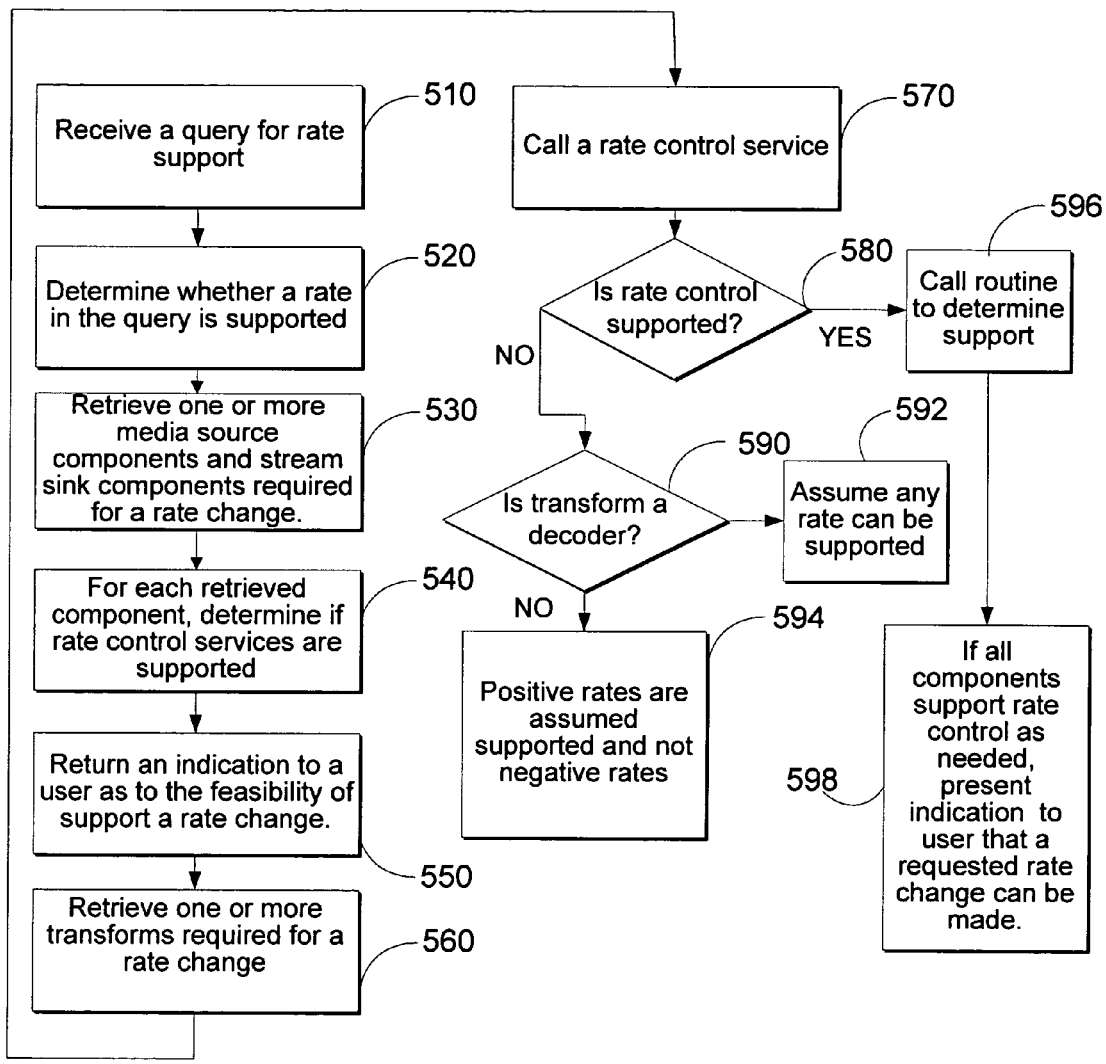
FIG. 5 is a flow diagram illustrating how to determine the support for a rate change request in accordance with an embodiment of the present invention.

Referring now to FIG. 5, a flow diagram illustrates a method for determining rate support for a given multimedia configuration according to an embodiment. Block 510 provides for receiving a query for rate support. Media engine 460 receives the query. For example, a user operating the system can call MFGetService and implement a service, such as MF_RATE_CONTROL_SERVICE. Block 520 provides for determining whether a rate in the query is supported. A user can determine a rate by calling a function such as IMFRateSupport::IsRateSupported, IMFRateSupport::GetMinForwardRate, IMFRateSupport::GetMaxForwardRate, IMFRateSupport::GetMinReverseRate, IMFRateSupport::GetMaxReverseRate for example. In addition, a user can specify an additional restriction by using IMFRateSupport::SetMinForwardRate, IMFRateSupport::SetMaxForwardRate, IMFRateSupport::SetMinReverseRate, and IMFRateSupport::SetMaxReverseRate. The SetMaxRate could be used by the application to regulate the type of output of the pipeline. For example if the output is being passed over a network, and the network bandwidth is being exceeded, the application could limit the type of data being sent. In addition, the methods IMFRateSupport::SetForwardKeyframeRateMultiplier, IMFRateSupport::SetReverseKeyframeRateMultiplier, IMFRateSupport::GetForwardKeyframeRateMultiplier, and IMFRateSupport::GetReverseKeyframeRateMultiplier, would allow an application to control the intra-keyframe spacing so that at very fast forward and very fast reverse speeds it can control the total amount of data sent out of the pipeline. This can also be used to dynamically reduce the network bandwidth.

Block 530 provides for retrieving one or more media source components and stream sink components required for a rate change. Block 540 provides that, for each retrieved component, determining if rate control services are supported. Block 550 provides for returning an indication to a user as the feasibility of supporting a rate change. Block 560 provides for retrieving one or more transforms required for a rate change. For each transform, block 570 provides for calling a rate control service. Decision block 580 provides for determining whether rate control is supported. If not, decision block 590 provides for determining if the transform is a decoder. If so, block 592 provides for assuming that any rate can be supported with the transform. A decoder is a transform that takes a compressed media type as input, and an uncompressed media type as output. The Media Engine 460 will do the work to decode samples in forward and then reverse the samples before sending them on. In block 594, if rate control is not supported, and the transform is not a decoder, any positive rate is assumed supported and any negative rate is assumed not supported. In block 596, if rate control is supported, a routine is called to determine the support. Block 598 provides that, if all components support rate control as needed, an indication is presented to the user that a requested rate change can be made.

Figure 6:
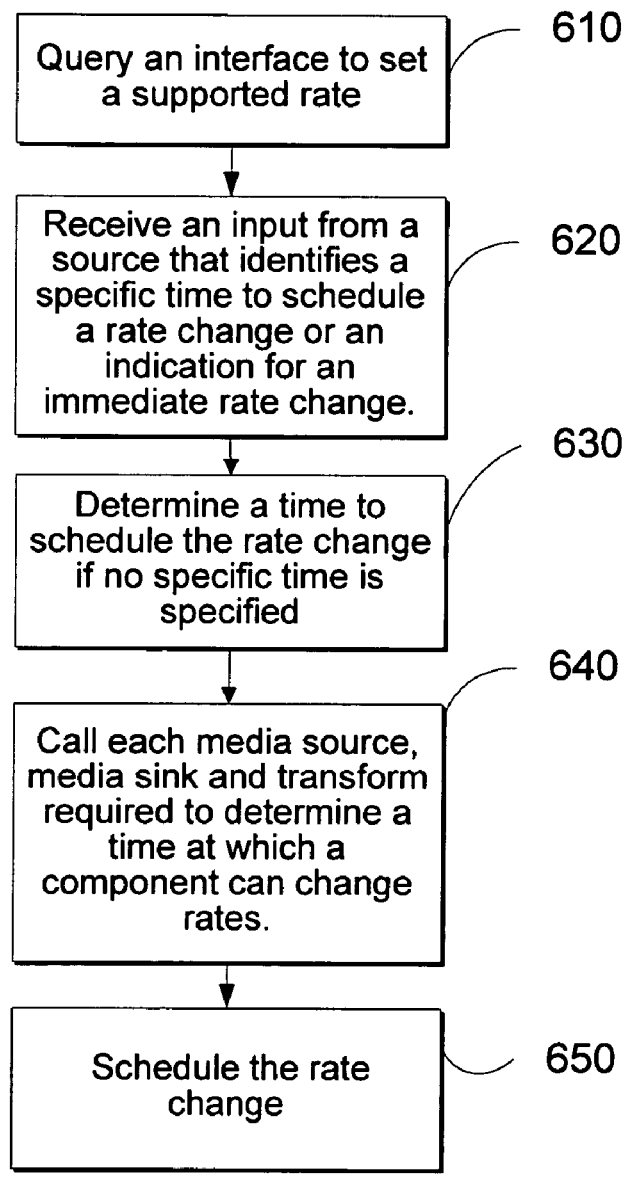
FIG. 6 is a flow diagram illustrating a method for scheduling a rate change in accordance with an embodiment of the present invention.

Referring now to FIG. 6, a method for scheduling a rate change is illustrated. Block 610 provides for querying an interface to set a supported rate. Block 620 provides for receiving an input from a user or other source that identifies a specific time to schedule a rate change or an indication for an immediate rate change. Block 630 provides for determining a time to schedule the rate change if no specific time is specified in block 620. Block 640 provides for calling each media source, media sink and transform required to determine a time at which a component can change rates. Block 650 provides for scheduling the rate change.

Figure 7:
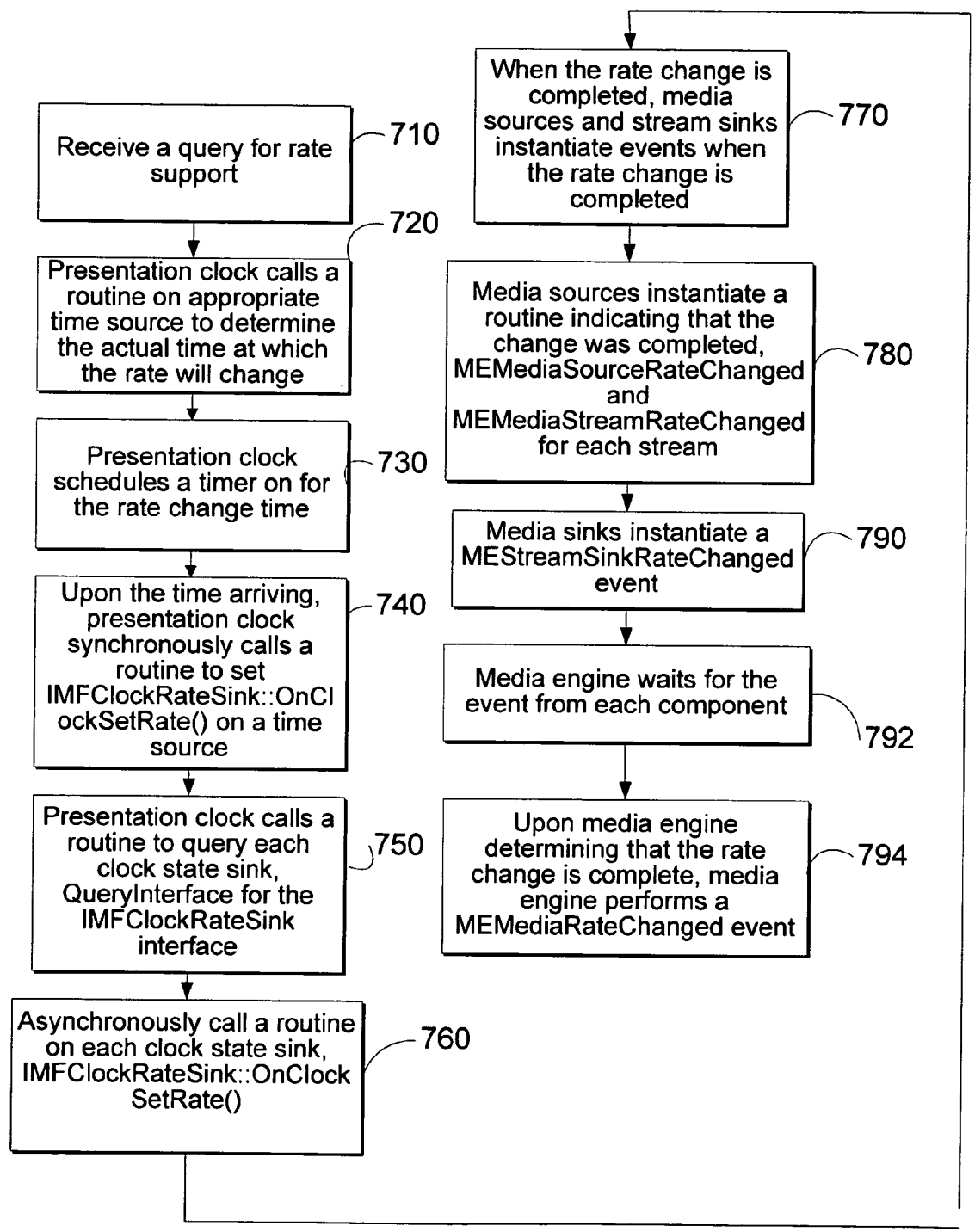
FIG. 7 is a flow diagram illustrating a method for causing a rate change including function calls to routines in accordance with an embodiment of the present invention.

Referring now to FIG. 7, a flow diagram illustrates a method for implementing rate change once it is determined that a rate change can be performed on any necessary components, such as the media source, transforms and stream sinks. Block 710 provides for calling a routine that schedules a rate change on the presentation clock. For example, the routine IMFRateControl::ScheduleRateChange( ). Block 720 provides for the presentation clock to calls a routine, such as IMFRateControl::GetRateChangeTime( ) on an appropriate time source to determine the actual time as which the rate will change. The time of the change can be the same as a specified rate change time, but race conditions can cause a later change. Alternatively, to perform a rate change as soon as possible the IMFRateControl::ScheduleRateChange( ) method can be passed a special time indicating 'now' and the method can atomically schedule the change and return the scheduled time. This eliminates the race condition. Block 730 provides for the presentation clock to schedule a timer on for the rate change time. Upon the time arriving, block 740 provides for the presentation clock to synchronously call a routine to set IMFClockRateSink::OnClockSetRate( ) on a time source. Calling the routine changes the rate at which the clock is running. Block 750 provides for the presentation clock to call a routine to query each clock state sink, QueryInterface for the IMFClockRateSink interface. The clock state sinks can be the media sinks 412 operating as renderers.

Block 760 provides for asynchronously calling a routine on each clock state sink, IMFClockRateSink::OnClockSetRate( ). When the rate change is completed, block 770 provides for media sources and stream sinks to instantiate events when the rate change is completed. Block 780 provides for media sources to instantiate a routine indicating that the change was completed, MEMediaSourceRateChanged, and MEMediaStreamRateChanged for each stream. Block 790 provides for media sinks to instantiate a MEStreamSinkRateChanged event. Depending on the particular component, this notification may be performed immediately after the ScheduleRateChange( ) call, or after the OnClockSetRate( ) notification. Block 792 provides that media engine waits for the event from each component. Upon media engines determining that the rate change is complete, media engine performs a MEMediaRateChanged event in block 794.

Figure 8:
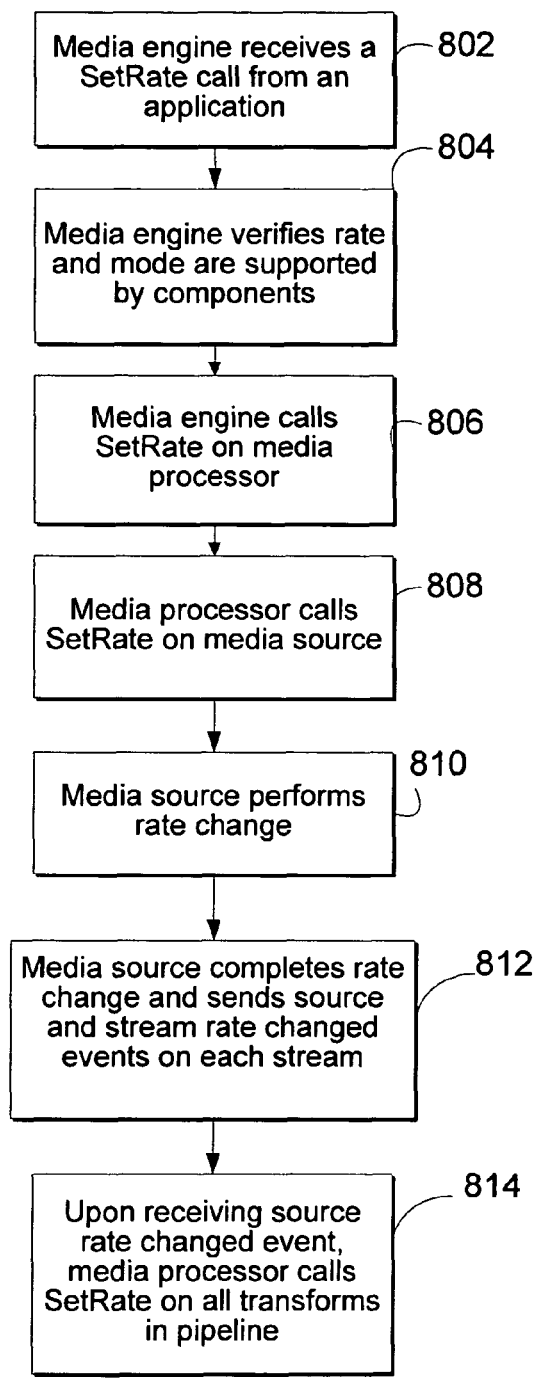
FIG. 8 is a flow diagram illustrating a method for causing a rate change in accordance with an alternate embodiment of the present invention.

Referring now to FIG. 8, an alternate embodiment for determining a rate change is explained in further detail. Block 802 provides for an application to call a SetRate method on media engine 460 with a new rate. Before proceeding, block 804 provides that media engine 460 verifies that this rate and rate mode are supported by all components. Block 806 provides that media engine 460 calls SetRate on media processor 420. Block 808 provides that media processor 420 calls SetRate on media source 410. Block 810 provides that media source 410 performs the rate change. The rate change could happen immediately, or it could take as long as several seconds, depending upon the type of source. For instance, a local file source can probably change rate instantaneously, whereas a source receiving data from over the network probably cannot. The source can communicate back to the network source that a different supply rate is required. It could wait until the data flowing at the new rate is received before the rate change is propagated down the processing pipeline.

Block 812 provides that when media source 410 completes processing the rate change, it sends MESourceRateChanged and MEStreamRateChanged (one per stream) events. For a rate mode change, MEStreamRateModeChanged is sent on each stream for which the rate mode change results in a different data format being used. This event is queued so that it arrives between the final sample in the last rate mode's format and the first sample in the new rate mode's format. Block 814 provides that, upon receipt of the MESourceRateChanged event, media processor 420 calls SetRate on all transforms in the pipeline. Some transforms may change their behavior due to this call. For example, a decoder transform might decide to decode at a lower quality when the rate is increased so that it will still be able to keep up.

In addition, the decoder transform can be configured to have 'internal' rate modes which causes the decoder transform to produce different output depending on the rate even though the input data is the same. The decoder may still have retained data from the previous rate. For example, in the forward decoding case, the rate may change from 4× to 1×. The decoder may have unsent data on its output which has been processed for 4× output. The decoder may have discarded every other frame. When the decoder receives the rate change to 1×, the decoder could either finish emitting all of the 4× data at 4× (thereby introducing a delay for the rate change equal to the unsent data) or display the 4× data at 1× (thereby producing a 'slideshow' like degraded experience). Alternatively, the decoder can revoke the output data and re-decode the data as 1× data. Re-decoding the data not only produces a better user experience but also eliminates the latency of decoded queued output data. In the opposite transition from a low rate to a high rate (e.g. 1× to 3×), the decoder would attempt to emit the 1× data at a higher rate 3× rate which the display pipeline may not be able to handle. The decoder could reprocess the output data to avoid causing the pipeline to become oversaturated with data.

The optimization described above becomes significantly more important when performing reverse decoding. The component can be given blocks of data in reverse order. The component can perform reverse decoding by selectively decoding and caching keyframes forwards in the block then only regenerating the non-keyframes as the component decodes backwards. Instead of delaying the rate change, the component can simply generate more data as it is decoding backwards.

When performing a direction reversal from forwards to backwards, the decoder will have already decoded (and not yet sent) many of the frames at the start of the block. The decoded and not yet sent frames provide a significant decoding cost savings as these frames are directly useable to perform the reverse decoding instantaneously. Even the presence of a few frames will provide the decoder significant amounts of time to reduce the initial latency incurred when starting to reverse decode.

Figure 9:
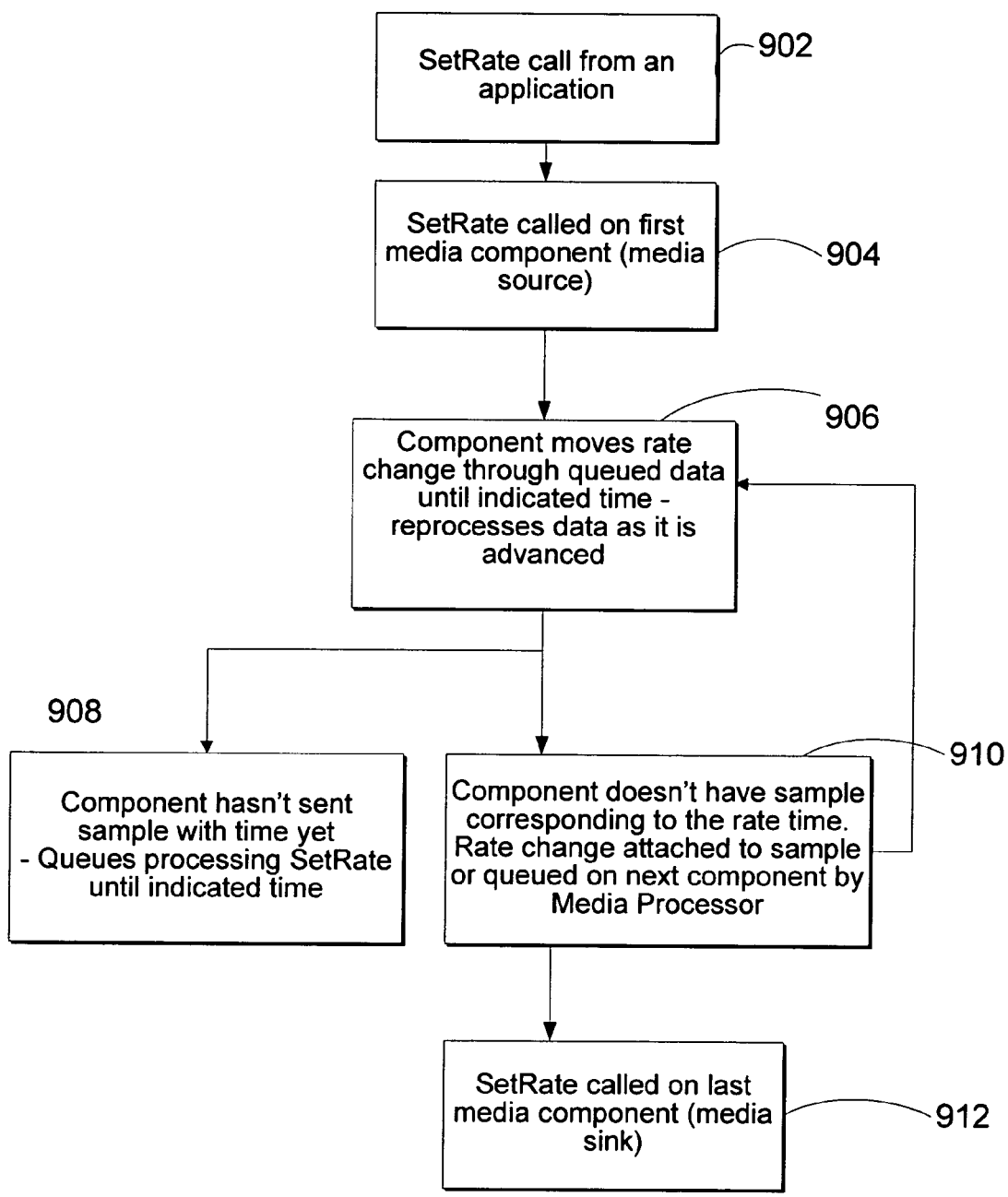
FIG. 9 is a flow diagram illustrating a method for a rate mode change in accordance with an embodiment of the present invention.

Referring now to FIG. 9, a flow diagram illustrates another embodiment of a scheme for handling rate changes. Rate change commands can be considered to be semantically inband rate commands that flow with the data. An equivalent algorithm can be accomplished by communicating the rate changes through interface calls to the components. The data between two rate change times will be considered to be processed to be shown at the earlier time. For example, if a rate of 3× is at time 4 and a rate of 1× is at time 8, then the frames between 4 and 8 will be processed to be shown at 3× and the frames beyond time 8 will be at 1×.

A rate change command from the application, shown in block 902, is scheduled with the next input sample to the source, shown in block 904. The rate change command could be associated with the next input sample to the source or communicated to the source to be queued to be serialized with the source data processing. The rate change can either be scheduled for an exact time or as soon as possible (i.e. 'now').

If a component has a sample in its input queue or if the component is processing the sample, then the component semantically attaches the rate change to that sample so that the sample can be processed with the data (or queues the sample to be processed along with the sample at the time location). If a rate change is already present, then the rate change command can be promoted 'through' the next rate change command, shown in block 906. As the rate change is moved forward, the component removes the old rate change command and reprocesses the data for the updated rate. Some transitions may not be possible if the data is in a different format (e.g. keyframe data versus full frame smooth data or if the data switches from forward blocks to reverse blocks). For transforms, the data could be re-constructable. Many optimizations such as the direction reversal within a block would be possible.

A rate change scheduled for 'now' or a previous time would be able to be moved forward in all queues from component to component, as shown in block 910, up to the soonest theoretical location (an optimal rate change without revoking the data in the pipeline that came from the source) and would produce the updated output. For 'now' rate changes, the call would possibly arrive at the sink, as shown in block 912.

Figure 10:
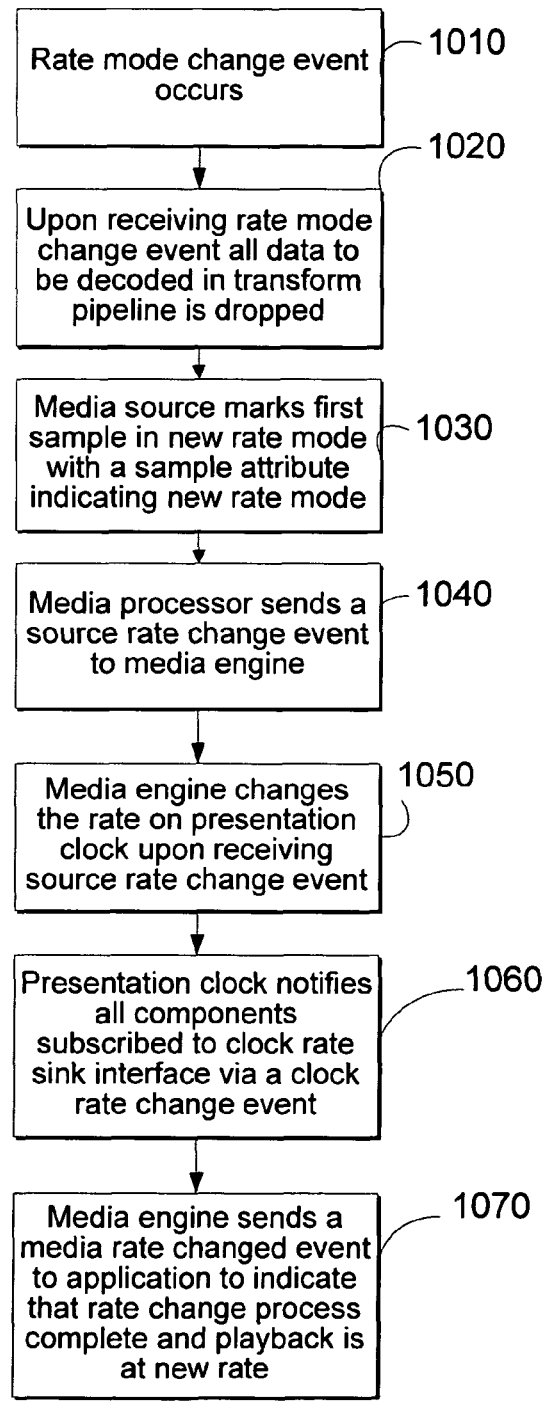
FIG. 10 is a flow diagram illustrating a method for setting a rate in accordance with an embodiment of the present invention.

Referring now to FIG. 10, another embodiment is directed to rate mode changes. Block 1010 provides that a rate mode change event occurs. Block 1020 provides that upon receiving the event, which could be a MEStreamRateModeChanged event, all data that is waiting to be decoded in a transform pipeline is dropped upon receipt of the MEStreamRateModeChanged event. This accelerates the transition to the new rate mode. Block 1030 provides that media source 410 marks the first sample that is in the new rate mode with a sample attribute indicating the new rate mode. Decoders that are configured to care will recognize this attribute and realize that the data is now in a new format. Block 1040 provides that media processor 420 sends the MESourceRateChanged event to the media engine 460. Upon receipt of the MESourceRateChanged event, block 1050 provides that media engine 460 change the rate on the presentation clock. Block 1060 provides that the presentation clock notifies all components that have subscribed to its IMFClockRateSink interface via OnClockRateChanged. More specifically, the OnClockRateChanged event is called synchronously on the component providing the time source. Commonly, this is the audio renderer media sink 430, although that is not always true. Note that it is at this point that the presentation actually begins to speed up or slow down. All other clock rate sinks, among them any media sinks that care about rate changes, receive the OnClockRateChanged call asynchronously. Block 1070 provides that media engine 460 sends the MEMediaRateChanged event to the application to indicate that the rate change process has completed and playback is now occurring at the new rate.

Referring now to Table 1, function calls to perform the routines for scheduling and performing rate changes are provided.

TABLE 1

| | |
|---|---|
| IMFRateSupport | Provides information about the rates that a given object supports and exposes interfaces to get minimum and maximum supported rates |
| IMFRateSupport::GetMinForwardRate | Provides the minimum rate that the given object supports. |
| MFRateSupport::GetMinReverseRate | |
| IMFRateSupport::GetMaxForwardRate | Provides the maximum rate that the given object supports |
| IMFRateSupport::GetMaxForwardKeyframeRate | |
| IMFRateSupport::GetMaxReverseRate | |
| IMFRateSupport::GetMaxReverseKeyframeRate | |
| IMFRateSupport::IsRateSupported | Indicates whether the given object supports a particular rate. Optionally additional output parameter if rate is supported by some and not all components: media engine returns a pointer to an object defining streams with playback ability for rate |
| IMFRateSupport::SetMaxForwardRate | Provides override capabilities for the application to specific additional restrictions for the maximum rate that the given object supports. |
| IMFRateSupport::SetMaxForwardKeyframeRate | |
| IMFRateSupport::SetMaxReverseRate | |
| IMFRateSupport::SetMaxReverseKeyframeRate | |
| IMFRateSupport::GetForwardKeyframeRateMultiplier | Query functions to get the current intra-keyframe distance multipliers. |
| IMFRateSupport::GetReverseKeyframeRateMultiplier | |

TABLE 1-continued

| | |
|---|---|
| IMFRateSupport::SetForwardKeyframeRateMultiplier<br>IMFRateSupport::SetReverseKeyframeRateMultiplier | Allows the application to increase the spacing between keyframes. |

TABLE 2

| | |
|---|---|
| IMFRateControl | Allows the user to manipulate the rate of the given object |
| IMFRateControl::GetRateChangeTime | allows the user to get the next available time that the component allows a rate change to occur. |
| IMFRateControl::ScheduleRateChange(rate, mode, maxkeyframe rate) | allows the user to request a rate change at a given time on the given object. |
| PRESENTATION_CURRENT_POSITION | in the case where the user wants the rate to change as soon as possible. |
| IMFRateControl::GetRate | Returns to the user the current rate of the given object. |
| IMFClockRateSink | Used for the presentation clock to indicate to its sinks when the rate has changed. Can be a QuaryInterface from IMFClockStateSink for any clock state sink that supports rate canges. |
| IMFClockRateSink::OnClockSetRate | is used by a presentation clock to indicate to its sinks that a rate change has occured. |

Referring now to Table 3, media engine events are outlined.

| | |
|---|---|
| MEMediaRateChanged | Media Engine sends the MEMediaRateChanged event in response to a ScheduleRateChange( ) call. |
| MESourceRateChanged | Media Source sends the MESourceRateChanged event in response to a ScheduleRateChange( ) call.. |
| MEStreamRateChanged | Media Stream sends the MEStreamRateChanged event when a ScheduleRateChange( ) call is made on the Media Source. The HRESULT associated with the event indicates to the user whether the stream was able to successfully process the ScheduleRateChange( ) call.. |
| MEStreamSinkRateChanged | Media Stream Sink sends the MEStreamSinkRateChanged event when its Media Sink receives the OnClockSetRate( ) callback from the presentation clock. The HRESULT associated with the event indicates to the user whether the stream sink was able to successfully process the rate change. |

The media engine 460 can be configured to support the MF_RATE_CONTROL_SERVICE. The rate control service supports an IMFRateSupport interface, allowing a user to query the rate capabilities of a current media session and the IMFRateControl interface. The interfaces allow a user to control the rate of the current media session.

Media engine 460 rate service supports the IMFRateSupport interface to allow the user to query for the rate capabilities of the current media session. The supported rates may change for a particular media engine 460. For example, if a user queries for a supported rate, closes a current URL and opens another one, and then queries for a different rate, the result may be different. Further, the supported rate may even change with no user input. For example, when playing a media clip, a rate of 5.0 might be supported for most of the clip, but not supported for an advertisement at the beginning of the clip.

Media engine 460 determines the rate capabilities by querying the components involved in the current media session. These components include media sources 410, transforms 408, and media sinks 430. The supported rates can be determined by the following rules: a rate of 1.0 should always supported; if any of the Media Sources or Stream Sinks do not support the MF_RATE_CONTROL_SERVICE, only rate 1.0 is supported; if any of the Transforms do not support MF_RATE_CONTROL_SERVICE, it is assumed to support any forward (>0.0) rate; a minimum rate for a mode is the maximum of the minimum rates of all components for the mode; a maximum rate for a mode is the minimum of the maximum rate for that mode over all components.

In one embodiment, media engine 460 rate control service exposes the IMFRateControl interface to allow the user to manipulate the rate. The user may call ScheduleRateChange( ) to set the rate of the current playback session. The MEMediaRateChanged event is instantiated to indicate when the rate change has been processed, and also the success or failure of the rate change.

In another embodiment, IMFRateControl API can be simplified to provide that methods such as GetRate, ScheduleRateChange and GetRateChangeTime are two methods. For example, an API could include a GetRate method that allows an application to query a current playback rate and a current playback mode. A second method could be a SetRate method that allows an application to request a new playback rate and/or rate mode to take place as soon as possible. Once all rate-aware components in Media Engine 460 have handled the rate change, Media Engine 460 sends an MEMediaRateChanged event back to the application. If some component encountered an error when attempting to change rates, the MEMediaRateChanged event returns indicating an error code that provides more detail about the error. The second method, SetRate, can also be configured to take an argument specifying stream selection criteria to indicate which streams should play back when playing at the chosen rate. The method IMFRateSupport::IsRateSupported can be called in lieu of configuring SetRate to take on the stream selection functionality. In either case, stream selection criteria can be passed to all components that support IMFRateControl. The parameter then advises media source 410 that it no longer needs to produce data for the streams that will not be played back at a predetermined rate and components can be configured to ignore the parameter.

The application may leave the rate mode unspecified if it wants Media Engine to determine the best rate mode for the desired rate. If the rate mode is specified, then it is used if all components support it.

In addition to media engine 460, media source 410 can also be configured to supports the rate control service. As an example, consider an application playing back live content for which media source 410 maintains a moving buffer of the presentation corresponding to a section of the presentation that includes a current playback position, which could allow a user to "pause" live content, for example. The live presentation is occurring at a 1× rate and the buffer moves forward at a 1× rate. However, an application could play back at a 2× rate. At some point the application's playback will catch up to the end of the buffered section of content thereby exhausting the buffer. When nearing the end of the buffer, media source 410 can be configured to request that the playback rate revert to 1× to continue to stay within the buffer to avoid exhausting the buffer. In such a case, media source 410 is a timeline source and the rate supported is a function of the different clips in the timeline. If a current playback rate becomes unsupported in a new clip, the timeline source, here media source 410, requests a new rate. Likewise, when a rewind occurs to the start of content or a live content reverse point, an end of signal can be generated. Media processor 460 can be configured to generate a fast forward to live content, which can be configured to operate with media source 410 such that media source 410 indicates that it is running out of content to enable media processor 460 to avoid polling the current position versus a maximum position and schedule a transition to 1× if needed.

In one embodiment, media source 410 initiates rate changes by sending an MERateChangeRequested event to media processor 420, which forwards an event to media engine 360. Media engine 360 can be configured to attempt to carry out a rate change. After a rate change, an application can be notified via a MEMediaRateChanged method.

If media source 410 does not support the service, a rate of 1.0 can be assumed. Although a default rate can be assumed, media source 410 can be configured to try to deliver data at a rate requested by the user if a user calls IMFMediaStream:: ProcessSample( ), even if this is faster or slower than the specified rate. The rate should be interpreted as a hint as to what rate the user plans to retrieve data. In the case of a playback scenario, the rate is likely to be very close to the actual rate, but in other scenarios the user may simply pull data from media source 410 as quickly as the processor allows. If a user successfully calls the IMFRateControl:: ScheduleRateChange( ) method on media source 410 while media source 410 is in the stopped state, in an embodiment, media source 410 can be configured to send a MESourceRateChanged event through a IMFMediaEventGenerator interface. Media source 410 can be configured to send a MEStreamRateChanged event through media stream source 414.

If the user successfully calls the IMFRateControl::ScheduleRateChange( ) method on media source 410 while the media source 410 is running, media source 410 can be configured to send a MESourceRateChanged event, and a MEStreamRateChanged event through all active media stream sources 414. If IMFRateControl::ScheduleRateChange( ) immediately fails and returns an error code, no events should be sent. The ScheduleRateChange( ) call may also fail asynchronously, in which case the MESourceRateChanged event must still be sent, but should contain a failure HRESULT to indicate to the user that the rate was not successfully changed.

Another component that performs functions for rate change includes transforms 408. Transforms 408 can be configured to support the MF_RATE_CONTROL_SERVICE. If a transform 408 does not support the service, the transform is implicitly assumed to support any positive rate, and is not required to be notified of any rate changes that occur.

If a transform 408 does support the rate service, the transform 408 nonetheless has a chance to further communicate capabilities and receive notifications of rate changes. The transform can also be configured to indicate that it supports operating in reverse.

Calls can be made to the IMFRateSupport to retrieve the rate capabilities of the transform, and calls can be made to IMFRateControl::ScheduleRateChange( ) when a rate change occurs. In one embodiment, transform 408 is not required to send any event to indicate that the rate change has occurred.

When a transform 408 is operating in reverse, timestamps on the samples will decrease as they are fed into the transform. Thus, the transform can be configured to be aware of rate changes to expect sample timestamps to act in this manner, and operate appropriately.

Regarding transforms 408 that are compressed transforms operating on compressed data, also referred to as decoders, the transform may be required to complete more complex steps. In the case where the transform indicates that it supports reverse playback, the transform handles the complexity, it is treated as a normal transform. If the transform does not support reverse playback, media engine 460 can be configured as discussed above to perform functions to guarantee reverse playback.

For a video decoder, the transform 408 needs to receive samples from key frame to key frame in the forward direction, generating the uncompressed video. Then, the user will need to dispense the uncompressed frames in the reverse direction. There is some memory overhead required for this process.

For an audio decoder, such a transform 408 may require receiving a set of samples in the forward direction. Receiving a set of samples in the forward direction generates an amount of uncompressed audio, which the media engine then needs to reverse and dispense. Then, the media engine needs to back up a sample, and send another set of samples (in the forward direction) to the transform, until overlapping audio is generated with the previously generated data. This process continues backwards, but in each case the transform sees the decoding as a discreet series of forward decoding steps.

Media sink 430 can be configured to support the rate control service. If a media sink 430 does not support the MF_RATE_CONTROL_SERVICE service, it does not support rate changes and is assumed to always run at a rate of 1.0. A media stream sink 412 with a IMFStreamSink interface can be configured to not expose the MF_RATE_CONTROL_SERVICE. The rate for media stream sink 412 is controlled by media sink 430 that is responsible for a given media stream sink 412.

In another embodiment, the audio decoder supports reverse playback and variable rates. In this case it will natively produce reversed that and possible pitch corrected data.

In one embodiment, media sink 430 supports a IMFRateSupport interface, but not a IMFRateControl interface. Media sink 430 can be configured to process samples at a rate determined by a presentation clock, rather than performing a determination based on a rate configured on the MF_RATE_CONTROL_SERVICE.

If a media sink 430 supports the MF_RATE_CONTROL_SERVICE, media sink 430 can also be configured to support a IMFClockRateSink interface. In one embodiment, the IMFClockRateSink is a QueryInterface off of the IMFClockStateSink used by the presentation clock. When a rate change occurs, the presentation clock can be configured to call IMFClockRateSink::OnClockSetRate method. At this point, media sink 430 can be configured to change its rate, and send the MEStreamSinkRateChanged event to indicate that the rate change has been processed. In the case of an error, the MEStreamSinkRateChanged event can have a failure HRESULT to indicate that the rate change was not successful.

Along with each sample of data the transform has the opportunity to attach a piece of data that indicates the effective rate of the contents of the stream. This allows a transform to preprocess the data (such as doubling its speed by discarded every other frame for 2× playback) and indicate that it has been processed. When a component down the pipeline encounters an 'effective rate' flag, it will know to avoid double processing the rate request In view of the many possible embodiments to which the principles of this invention may be applied, it should be recognized that the embodiment described herein with respect to the drawing figures is meant to be illustrative only and should not be taken as limiting the scope of invention. For example, those skilled in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method for determining the capabilities of a media system, the method comprising:
processing a multimedia stream in the media system at a first rate, the multimedia system comprising a plurality of functional objects including a media source, a transform, and a media sink, the first rate corresponding to a first mode in a set of modes including a reverse skip mode, a reverse key frame mode, a reverse full mode, a forward full mode, a forward key frame mode, or a forward skip mode;
while the multimedia stream is being processed at the first rate, receiving a request to process the multimedia stream at a second rate, the second rate corresponding to a second mode in the set of modes that is different than the first mode;
querying each functional objects in the media system to determine a functional limit of each functional objects for a maximum playback rate of the multimedia stream in the second mode; and
determining whether the multimedia system supports playback of the multimedia stream at the second rate by comparing the second rate to the maximum playback rate returned by each functional object such that if the second rate is below the maximum playback rate returned by each functional object, the multimedia system commences playback of the multimedia stream at the second rate, whereas if the second rate exceeds the maximum playback rate returned by each functional object, the multimedia system continues playback of the multimedia stream at the first rate.

2. A multimedia system comprising:
a processor and at least one computer readable medium storing the following components:
a control layer configured to receive one or more media data streams from an application; and
a core layer coupled to the control layer, the control layer including a plurality of functional components including a media source, a stream source, a transform, a media sink, and a stream sink, the control layer also including a media engine component configured to perform the following:
process the one or more media data streams at a first rate corresponding to a first mode in a set of modes including a reverse skip mode, a reverse key frame mode, a reverse full mode, a forward full mode, a forward key frame mode, or a forward skip mode;
while the one or more media data streams are being processed at the first rate, receiving a request to process the one or more media data streams at a second rate, the second rate corresponding to a second mode in the set of modes that is different than the first mode;
querying each functional object to determine a functional limit of each functional object for a maximum playback rate of the one or more media data streams in the second mode; and
determining whether playback of the one or more media data streams is supported at the second rate by comparing the second rate to the maximum playback rate returned by each functional object such that if the second rate is below the maximum playback rate returned by each functional object, the media engine component commences playback of the one or more media data streams at the second rate, whereas if the second rate exceeds the maximum playback rate returned by each functional object, the media engine component continues playback of the one or more media data streams at the first rate.

3. The multimedia system of claim 2 wherein the control layer includes:
the media engine;
a topology loader configured to identify data flow;
a media session configured to interface with core layer components; and
a media processor configured to perform transforms on the media data streams.

4. The multimedia system of claim 2 wherein the media engine is configured to use floating point values to linearly indicate a speed of playback.

5. The multimedia system of claim 4 wherein a negative rate specifies a backward playback.

6. The multimedia system of claim 2 wherein the media source is configured to provide a presentation timestamp for media samples on the media stream, the samples configured to preserve the presentation timestamp independent of a rate for media playback.

7. The multimedia system of claim 2 wherein the multimedia system further includes a presentation clock configured to run time according to a current rate, and wherein the media sinks is coupled to the presentation clock and is configured to display data according to the presentation clock and independent of non-presentation clock component timestamps.

8. The multimedia system of claim 2 wherein the media engine is configured to respond to requests for rate direction changes by playing out any remaining content up to a timestamp of a direction change, discarding any data in a pipeline, setting a rate of playback and restarting playback in an opposite direction in accordance with the direction change.

9. The multimedia system of claim 8 wherein data repeated after the restarting playback is discarded.

10. The multimedia system of claim 8 wherein the media engine is configured to be independent of tracking multiple playback rates unless the rates are within a same mode.

11. The multimedia system of claim 10 wherein one or more components in the core layer are configured to maintain a list of pending rate changes, each component having active only one rate at a time, each component configured to maintain a playback rate independent of tracking rate changes.

12. The multimedia system of claim 2 wherein the media engine is configured to support backward decoding for coder-decoders that do not support backward decoding, the media engine configured to perform forward decoding, and reverse any decoded samples.

13. The multimedia system of claim 12 wherein the reversed decoded samples are available for reuse.

14. A computer storage medium having computer-executable instructions for determining the capabilities of a multimedia system, the computer-executable instructions performing acts comprising:

processing a multimedia stream in the media system at a first rate, the multimedia system comprising a plurality of functional objects including a media source, a transform, and a media sink, the first rate corresponding to a first mode in a set of modes including a reverse skip mode, a reverse key frame mode, a reverse full mode, a forward full mode, a forward key frame mode, or a forward skip mode;

while the multimedia stream is being processed at the first rate, receiving a request to process the multimedia stream at a second rate, the second rate corresponding to a second mode in the set of modes that is different than the first mode;

querying each functional object in the media system to determine a functional limit of each functional object for a maximum playback rate of the multimedia stream in the second mode; and determining whether the multimedia system supports playback of the multimedia stream at the second rate by comparing the second rate to the maximum playback rate returned by each functional object such that if the second rate is below the maximum playback rate returned by each functional object, the multimedia system commences playback of the multimedia stream at the second rate, whereas if the second rate exceeds the maximum playback rate returned by each functional object, the multimedia system continues playback of the multimedia stream at the first rate.

* * * * *

UNITED STATES PATENT AND TRADEMARK OFFICE
CERTIFICATE OF CORRECTION

PATENT NO. : 7,792,806 B2
APPLICATION NO. : 10/609182
DATED : September 7, 2010
INVENTOR(S) : Geoffrey T. Dunbar et al.

Page 1 of 1

It is certified that error appears in the above-identified patent and that said Letters Patent is hereby corrected as shown below:

Column 21, line 40, in Claim 1, delete "objects" and insert -- object --, therefor.

Column 21, line 41, in Claim 1, delete "objects" and insert -- object --, therefor.

Column 22, line 49, in Claim 7, delete "sinks" and insert -- sink --, therefor.

Signed and Sealed this
Twenty-fifth Day of January, 2011

David J. Kappos
*Director of the United States Patent and Trademark Office*